April 8, 1947. M. R. HUTCHISON, JR., ET AL 2,418,644
SLIDING SHUTTER FOR CAMERAS
Filed Dec. 8, 1944
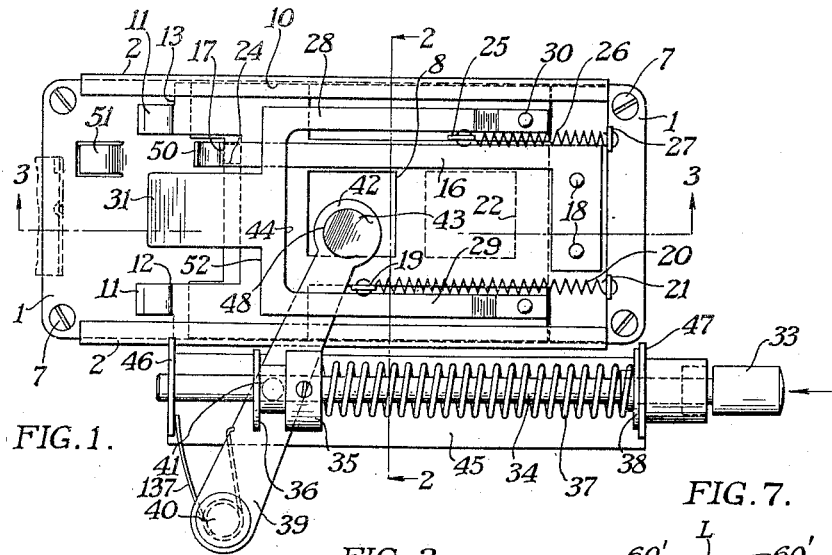
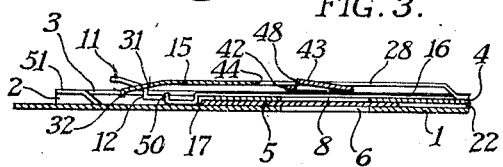
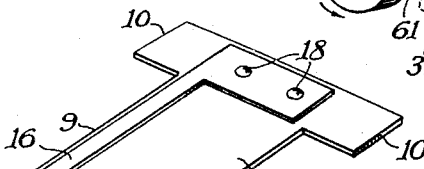
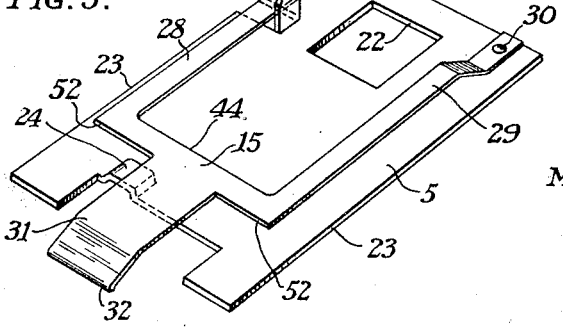
MILLER R. HUTCHISON, JR.
HERBERT H. HARMON
INVENTORS
BY
ATTORNEYS Patented Apr. 8, 1947

2,418,644

UNITED STATES PATENT OFFICE 2,418,644

SLIDING SHUTTER FOR CAMERAS

Miller R. Hutchison, Jr., and Herbert H. Harmon, Rochester, N. Y., assignors to Eastman Kodak Company, Rochester, N. Y., a corporation of New Jersey Application December 8, 1944, Serial No. 567,146

6 Claims. (Cl. 95—55)

This invention relates to photography and more particularly to inexpensive camera shutters. One object of our invention is to provide a shutter of the sliding plate type which is inexpensive and which can be assembled by relatively unskilled help. Another object of our invention is to provide a shutter with two sliding plates for controlling the exposure and to provide a single lever for both setting and releasing the shutter plates. Another object of our invention is to provide a shutter of the class described in which the shutter plates normally lie in an overlapping relationship to exclude light, from which position they may be first moved to tension their respective springs and then released one after the other to permit light to momentarily enter through the exposure aperture.

Shutters which employ two sliding plates movable in ways on a camera part are well known and are perhaps the oldest type of shutter. Such shutters are generally made in two different forms. First, the shutter may consist of two plates only one of which is used to actually make the exposure, the other plate being used as a cover blind to obstruct light during the setting movement of the single plate which makes the exposure. Second, the shutter may consist of two plates, one edge of each plate making an exposure, the two plates being set by a setting lever and released by a shutter trigger.

Our present shutter does not come directly under either of these two types, although it closely approaches both of them. We provide two shutter plates each of which includes an edge determining the width of the exposure aperture and we provide a trigger which automatically sets both shutter members so that one shutter plate is released after the other to make an exposure. Thus we provide a completely automatic and extremely inexpensive shutter in which two plates are actually used to make the exposure and which is, at the same time, a nonsetting shutter.

Coming now to the drawings wherein like reference characters denote like parts throughout:

Fig. 1 is a top plan view of a shutter constructed in accordance with and embodying a preferred form of my invention;

Fig. 2 is an enlarged fragmentary sectional view taken on line 2—2 of Fig. 1;

Fig. 3 is a sectional view taken on line 3—3 of Fig. 1;

Fig. 4 is a perspective view of the first shutter plate;

Fig. 5 is a similar view of the second shutter plate;

Fig. 6 is a fragmentary top plan view of the shutter parts in a position they assume just prior to the release of the second shutter member; and Fig. 7 is a perspective detail of the "bulb" exposure control member.

Our shutter consists broadly in a slideway in which two shutter plates are supported and in which they may be set and released by merely depressing a shutter trigger. One shutter plate moves after the other and the exposure is controlled by one edge of each of the two plates.

More specifically, our shutter may consist of a base plate 1 having slideways 2 formed by folding over the edges of the base plate 1 so that flanges 3 and the base 1 may slidably support a first shutter member 4 and a second shutter member 5 in the guideways. The base plate 1 is provided with an exposure aperture 6 through which light may pass to make an exposure. The base plate 1 may be attached by any suitable means, such as screws 7, to the front board of an inexpensive camera.

As indicated in Fig. 4, the first shutter plate (so called because this plate is the first to cross the exposure aperture) consists of a flat stamping having an exposure aperture 8 therein. This plate has cutout portions 9 on each side and there are four lugs 10 which engage the slideway 3. Two arms 11 are bent upwardly at 12 and outwardly at 13, these arms forming a trip for a latch member 15 carried by the second shutter plate 5. The first shutter plate 4 is provided with a spring arm 16 terminating in a latch member 17 at one end and riveted at 18 to the shutter plate 4. This plate also carries an upstanding arm 19 to which a spring 20 is anchored, the opposite end of the spring being anchored on an upturned lug 21 carried by the supporting plate 1.

The second shutter plate 5 is also provided with an exposure aperture 22 and rails 23 which may slide in the guideways 3. There is a formed-up portion 24 which constitutes a latch element which may be engaged by a spring latch 17. A turned-up lug 25 carries one end of a spring 26 anchored on its opposite end on a lug 27. The spring latch element on this shutter plate is a substantially U-shaped member 28, the arms 29 of which are formed up and the ends of these arms being attached to the plate 5 by means of rivets 30. A pawl 31 extends outwardly from the U-shaped member 15 and is bent downwardly as shown at 32. These two plates are assembled one over the other as shown in Fig. 1, the cut-out portions 9 of the first plate giving clearance for the spaced arms 29 of the U-shaped member 28.

The shutter is provided with a trigger 33 which includes a downwardly extending rod 34 carrying a sleeve 35 pinned to the rod 34 and including a groove 36. A spring 37 between the sleeve 35 and a sleeve 38 normally holds the sleeve 38 outwardly. The purpose of this sleeve is, as shown in the copending application of Miller R. Hutchison, Jr., Serial No. 535,511, filed May 13, 1944, to prevent double exposure. When the trigger 33 is moved against its spring 137 in the direction shown by the arrow (Fig. 1), an exposure is made. Spring 137 is materially stronger than spring 37 so that it will normally hold the trigger in the position of rest shown in Fig. 1.

The trigger likewise includes a lever 39 pivoted at 40 to a camera wall and including a pin 41 extending upwardly into the groove 36 of the sleeve 35. On the inner end of arm 39 there is a forming 42 having an arcuately punched-out lug 43, this lug being punched out only a distance sufficient to provide an edge for engaging the edge 44 of the U-shaped spring member 28 of the shutter plate 5. A plate 45 carries bearings 46 and 47 in which the rod 34 may slide and consequently when the trigger is depressed the punched-out edge 48 of the arcuate cut-out 43 engages the edge 44 of the spring carried by plate 5 moving this plate against the pressure of spring 26 to a set position. As the plate 5 slides the plate 4 also slides towards the left in the view shown in Fig. 1 because of the spring latch 17 which is in engagement with the forming 24. Thus both plates move together towards a set position and they remain in the relationship shown in Fig. 1 with their respective apertures 8 and 22 out of alignment with each other. As the stroke of the trigger 33 approaches the end and the lever 39 is moved through approximately its full stroke, the upturned end 50 of the spring arm 16 reaches the formed-up cam 51 on the plate 1 and the latch member 17 is cammed upwardly until it is freed from lug 24. This permits plate 4 to slide and when its sliding movement has reached such an extent that the cams 11 pass under the edges 52 of the generally U-shaped spring 28, this spring member is lifted so that the edge 44 moves upwardly and off of the operating edge 48 on the lever 39. The plate 5 is released after predetermined movement of the plate 4 and it moves under the impulse of its spring 26.

Thus the exposure is made by depressing the trigger and this action moves, through the lever 39, the two shutter plates to first set and then release the two shutter plates. Moreover, the arm itself constitutes one of the latch elements which retains the second plate in position until a latch element carried by the second plate is released by abutments on the first-mentioned plate.

In order to produce prolonged exposures, such as are commonly called "bulb" exposures, we provide a means for preventing the cams 11 from raising that portion of the U-shaped spring member 15—that is the edge 44—which engages the edge 48 of the arm 39. This can readily be accomplished by placing a cam 60 provided with a lug 60'' on the end of a stud 61 in a wall of the camera. The cam 60 may be rotated through an arc limited by a lug L projecting into an arcuate slot S in the cam when the latter is turned by the exterior control knob 62. Offsets 60' may be provided to snap into a suitable notch in the lug L to retain the cam 60 against accidental displacement.

When the knob 62 is turned to produce a bulb exposure the lug 60'' rests on the tail 31 of the spring latch member 28 and consequently after the plate 4 has been released it cannot be lifted by the cam members 11 when the latter reach the edges 52 on the spring latch member. The edges 44 therefore are not lifted over the lug 43, so the shutter member 5 is not freed. The exposure aperture 8 thus remains open until such a time as the trigger is released, permitting the shutter plates to complete their movement, thus closing the exposure aperture. The shutter plates, therefore, are held in a position to make an exposure as long as the trigger is depressed when the knob 62 is turned to "B." When, however, it is turned to "I" for instantaneous exposures, the lug 60'' no longer prevents the tail 31 from moving upwardly so that instantaneous exposures are produced.

It will be noticed from the above description that our shutter consists of but few parts all of which can be made from either punch press parts or screw machine parts both of which are relatively inexpensive. The assembly of the shutter is extremely simple since the plates 4 and 5 are simply placed one over the other with the spring arms 28 passing upwardly through the cutout areas 9 of the plate 4 and the two plates may be slid into position in the rails or ways 3 of the supporting plate 1. The trigger and lever 39 can be easily assembled and the springs 26 and 20 positioned after the spring latch members 16 and 28 are riveted into place.

The operation of this shutter is extremely simple and there is but little opportunity for the parts to fail in regular operation. By depressing the trigger 33 the edge 48 of the pivoted lever 39 engages the edge 44 of the generally U-shaped spring member 28 carried by shutter plate 5. This moves this plate to a set position from which it may be automatically released. During this movement the latch 17 through its engagement with lug 24 will simultaneously move shutter plate 4. Shutter plate 4 is released when the beveled end 50 of the latch member 15 strikes the cam 51 struck up from the plate 1. This releases plate 4 so that it may move to open the exposure aperture and when the arms 11 cam the edge 44 of the U-shaped member 28 upwardly, the edge 44 is released from the arm edge 48 and the second plate follows the first closing the exposure aperture. While this shutter is designed for a single exposure of a known time, it is a simple matter to produce an exposure of the required duration. This may be done by providing the proper shaped openings 8 and 22 in the shutter plates 4 and 5. If it is desired that the shutters should make a short exposure, such as for instance 1/90 of a second as in the present case, the openings 8 and 22 can conveniently be made square so that they will just register with the exposure aperture 6. If, on the other hand, a longer exposure is required the slots 8 and 22 can be punched out in an elongated form and of such an extent that the required exposure will be obtained, the springs 20 and 26 of course being selected so that they will move the plates with the required rapidity. While we have shown a preferred embodiment of our invention in the drawings, it is obvious that changes can be made from the precise form shown in the drawings without departing from the scope of the claims.

What we claim is:

1. A camera shutter comprising, in combination, a support, a slideway carried by the support, an exposure aperture therein, two shutter plates slidably carried by the slideway, spring means for normally holding the plates at one end of the slideway and in a normal position of rest and resisting movements of the plates toward the other end of the slideway wherein the plates are in a set position, a spring latch comprising elements carried by the shutter plates for normally holding the shutter plates together, cutout portions in each shutter plate adapted to pass the exposure aperture and normally lying out of registration when said plates are latched together, the cut out portion of one plate lying over the exposure aperture when the shutter plates are in their normal position of rest, and the cut out portion of the other plate lying over the exposure aperture when the shutter plates are in a set position prior to exposure; a shutter latch trip in the path of movement of the spring latch for holding the shutter plates together, positioned to engage and release said latch when the shutter plates are moved into a set position, a shutter trigger including a swingable lever for moving the latched shutter plates into their set position, a second latch having elements, one on a shutter plate and the other on the swingable lever through which second latch said shutter plates may be moved to their set position, and means for releasing the second latch after the first latch has been released and a shutter plate has moved to its position of rest in the slideway comprising a latch-releasing member carried by the first moving shutter plate for releasing the latch element of the swingable lever whereby the second shutter plate may move to its position of rest in said guideway in which the two shutter plates may be again latched together.

2. A shutter as defined in claim 1 characterized by means for preventing the operation of said second latch whereby prolonged exposures may be obtained and the exposure may be terminated by releasing the trigger.

3. A shutter as defined in claim 1 characterized by the second latch element carried by the shutter plate including a spring member adapted to flex away from the shutter plate to release the latch element carried by the swingable member, and an adjustable means movable to and from a position to prevent said second latch element from being raised when moved to set the shutter plates and tension their operating springs.

4. A camera shutter comprising, in combination, a support, a slideway including an exposure aperture carried by the support, a pair of shutter plates including a first shutter plate and a second shutter plate each having a cutout portion through which light may pass to make an exposure, the cut out portion of one shutter plate lying over the exposure aperture when the shutter plates are in a normal position of rest, and the cut out portion of the other shutter plate lying over the exposure aperture when the plates are in a set position prior to exposure; both shutter plates being slidably mounted one over the other in the slideway, separate springs for each shutter plate normally holding the plates at one end of the slideway and in said normal position of rest with the cutout portion of one shutter lying out of registration with the cutout portion of the other shutter, a first spring latch normally holding the two shutter plates latched together with their respective cutout portions out of registration, means for setting the shutter plates together comprising a trigger including a swingable arm and a latch element carried thereby, a second latch element on the second shutter plate adapted to be engaged and moved by the swingable arm latch element for moving both shutter blades to a set position while the first latch holds the two shutter plates latched with their cutout portions out of registration, and means for releasing said shutter plates including the first spring latch and the second spring latch, an abutment for releasing the first spring latch whereby the first shutter plate may move under the impulse of its spring to uncover the exposure aperture, and a cam carried by the first shutter for releasing the second latch by moving the elements carried by the second shutter blade and the swingable member of the trigger from each other whereby the second shutter plate may move to close the exposure opening, and a separate spring operable upon release of the trigger to reengage the second latch elements.

5. A shutter as called for in claim 4 characterized by a time and bulb lever mounted to move to and from a second latch locking position whereby completion of the exposure may be affected by releasing the trigger.

6. A shutter as called for in claim 4 characterized by a time and bulb lever mounted to move to and from a second latch locking position whereby completion of the exposure may be affected by releasing the trigger, said time and bulb lever comprising an operating knob, a shaft carrying the knob, a cam on the shaft and means for limiting movement of the cam between a second latch locking position and a position clearing said second latch when said second latch elements are in a substantially set position.

MILLER R. HUTCHISON, JR.
HERBERT H. HARMON.

REFERENCES CITED

The following references are of record in the file of this patent:

UNITED STATES PATENTS

| Number | Name | Date |
| --- | --- | --- |
| 2,068,911 | Goldhammer | Jan. 26, 1937 |
| 2,267,794 | Kosken | Dec. 30, 1941 |
| 446,369 | Whitney | Feb. 10, 1891 |
| 491,921 | Blair et al. | Feb. 14, 1893 |